United States Patent
Ikarashi (10) Patent No.: US 11,240,012 B2
(45) Date of Patent: Feb. 1, 2022

(54) SECURE AGGREGATE ORDER SYSTEM, SECURE COMPUTATION APPARATUS, SECURE AGGREGATE ORDER METHOD, AND PROGRAM

(71) Applicant: NIPPON TELEGRAPH AND TELEPHONE CORPORATION, Tokyo (JP)

(72) Inventor: Dai Ikarashi, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/047,432

(22) PCT Filed: Apr. 17, 2019

(86) PCT No.: PCT/JP2019/016446
§ 371 (c)(1),
(2) Date: Oct. 14, 2020

(87) PCT Pub. No.: WO2019/203262
PCT Pub. Date: Oct. 24, 2019

(65) Prior Publication Data
US 2021/0152340 A1     May 20, 2021

(30) Foreign Application Priority Data
Apr. 20, 2018   (JP) .............................. JP2018-081095

(51) Int. Cl.
*H04L 27/06*     (2006.01)
*H04L 9/08*      (2006.01)
(Continued)

(52) U.S. Cl.
CPC .............. *H04L 9/085* (2013.01); *G06F 7/766* (2013.01); *G06F 7/768* (2013.01); *G06F 7/78* (2013.01)

(58) Field of Classification Search
None
See application file for complete search history.

(56) References Cited

U.S. PATENT DOCUMENTS 8,064,696 B2 * 11/2011 Radakovic ......... G06K 9/00402
                                                      382/181
9,703,812 B2 *  7/2017 Resch ..................... G06F 21/80
(Continued)

OTHER PUBLICATIONS

International Search Report and Written Opinion dated Jul. 16, 2019 for PCT/JP2019/016446 filed on Apr. 17, 2019, 9 pages with English translation of International Search Report.
(Continued)

*Primary Examiner* — Muang T Lwin
(74) *Attorney, Agent, or Firm* — Xsensus LLP (57) ABSTRACT

An aggregate order is efficiently obtained while keeping confidentiality. An inverse permutating part (12) generates a share of a vector representing an inversely permutated cross tabulation by applying inverse permutation to a cross tabulation of a table, the inverse permutation being a permutation which moves elements so that, when the table is grouped based on a key attribute, last elements of each group are sequentially arranged from beginning. A partial summing part (13) computes a prefix sum from the inversely permutated cross tabulation. The order computing part (14) generates a share of a vector representing ascending order within a group from a result of the prefix sum.

10 Claims, 5 Drawing Sheets

(51) Int. Cl.
G06F 7/76 (2006.01)
G06F 7/78 (2006.01)

(56) References Cited

U.S. PATENT DOCUMENTS

| | | | | |
|---|---|---|---|---|
| 2006/0171533 A1* | 8/2006 | Lee | ............... | H04N 19/192 |
| | | | | 380/28 |
| 2013/0182836 A1* | 7/2013 | Hamada | ............... | H04L 9/085 |
| | | | | 380/28 |
| 2013/0272521 A1* | 10/2013 | Kipnis | ............... | H04L 9/0833 |
| | | | | 380/44 |
| 2015/0149763 A1* | 5/2015 | Kamara | ............... | H04L 63/0428 |
| | | | | 713/150 |
| 2016/0321958 A1* | 11/2016 | Ikarashi | ............... | G06F 21/60 |

OTHER PUBLICATIONS

Ikarashi et al., "Secure Database Operations Using an Improved 3-party Verifiable Secure Function Evaluation", The 2011 Symposium on Cryptography and Information Security, Jan. 25-28, 2011, 20 pages with English Translation.

* cited by examiner

SECURE AGGREGATE ORDER SYSTEM, SECURE COMPUTATION APPARATUS, SECURE AGGREGATE ORDER METHOD, AND PROGRAM

CROSS-REFERENCE TO RELATED APPLICATIONS

The present application is based on PCT filing PCT/JP2019/016446, filed Apr. 17, 2019, which claims priority to JP 2018-081095, filed Apr. 20, 2018, the entire contents of each are incorporated herein by reference.

TECHNICAL FIELD

The present invention relates to a secure computation technique, and, particularly, relates to a technique of computing an aggregate function while keeping confidentiality.

BACKGROUND ART

An aggregate function is an operation for obtaining statistics grouped based on a value of a key attribute when a table includes a key attribute and a value attribute. The aggregate function is also referred to as a group-by operation. The key attribute is an attribute to be used for grouping records of the table, and, examples of the key attribute can include, for example, an official position, gender, or the like. The value attribute is an attribute to be used for computing statistics, and, examples of the value attribute can include, for example, salary, body height, or the like. The group-by operation is, for example, an operation for obtaining average body height by gender in a case where the key attribute is gender, or the like. The key attribute may be a composite key including a plurality of attributes, and, for example, in a case where the key attributes are gender and age, the group-by operation may be an operation for obtaining average body height of males in their teens, average body height of males in their twenties, . . . . Non-patent literature 1 discloses a method for performing the group-by operation using secure computation.

Aggregate order is one of aggregate functions and is an operation for obtaining at which order within a group, a value of a desired value attribute is positioned, when a table is grouped based on a value of a key attribute. The aggregate order is also referred to as order within the group, and includes ascending order within the group which is order when the value attributes are sorted in ascending order, and descending order within the group which is order when the value attributes are sorted in descending order. For example, when the key attributes are age and gender, and the value attribute is salary, the ascending order within the group is an operation for obtaining at which order the salary is positioned when counting from the lowest among males in their twenties, at which order the salary is positioned when counting from the lowest among males in their thirties, . . . , and the descending order within the group is an operation for obtaining at which order the salary is positioned when counting from the highest among males in their twenties, at which order the salary is positioned when counting from the highest among males in their thirties, . . . .

PRIOR ART LITERATURE

Non-Patent Literature

Non-patent literature 1: Dai Ikarashi, Koji Chida, Koki Hamada, and Katsumi Takahashi, "Secure Database Operations Using An Improved 3-party Verifiable Secure Function Evaluation", The 2011 Symposium on Cryptography and Information Security, 2011.

SUMMARY OF THE INVENTION

Problems to be Solved by the Invention

In a conventional secure computation technique, the number of times of communication required to obtain order within a group is log(n) where n is the number of subjects to be computed, which is inefficient.

In view of the technical problem as described above, an object of the present invention is to provide a technique which is capable of efficiently obtaining order within a group while keeping confidentiality.

Means to Solve the Problems

To solve the above-described problem, a secure aggregate order system according to a first aspect of the present invention is a secure aggregate order system comprising a plurality of secure computation apparatuses, m being an integer equal to or greater than 2, $[v]:=[v_0], \ldots, [v_{m-1}]$ being a share obtained by secret sharing a cross tabulation $v:=v_0, \ldots, v_{m-1}$ in which the number of records of each group when a table including a key attribute and a value attribute is grouped based on a value of the key attribute is set at elements corresponding to the number of groups from the head, and $\{\{\sigma\}\}$ being a share obtained by secret sharing a permutation $\sigma$ which moves elements so that last elements of each group are sequentially arranged from beginning when the table is grouped based on the value of the key attribute, each of the secure computation apparatuses comprising, an inverse permutating part configured to generate a share $[u]:=[\sigma^{-1}(v)]$ which becomes an inversely permutated cross tabulation $u:=\sigma^{-1}(v)$ obtained by inversely applying the permutation $\sigma$ to the cross tabulation $v$, when reconstructed, using the share $[v]$ and the share $\{\{\sigma\}\}$, a partial summing part configured to generate a share $[s]$ which becomes a vector $s:=s_0, \ldots, e_{m-1} \in F$, when reconstructed, by setting a sum from $[u_0]$ to $[u_i]$ at $[s_i]$ for each integer i equal to or greater than 0 and equal to or less than $m-1$ using the share $[u]$, and an order computing part configured to generate a share $[x]$ which becomes a vector $x:=x_0, \ldots, x_{m-1}$ representing ascending order within a group, when reconstructed, by setting $[x_i]:=[i-s_{i-1}]$ for each integer i equal to or greater than 1 and equal to or less than $m-1$ and setting $[x_0]:=[0]$ using the share $[s]$.

To solve the above-described problem, a secure aggregate order system according to a second aspect of the present invention is a secure aggregate order system comprising a plurality of secure computation apparatuses, m being an integer equal to or greater than 2, $[v]:=[v_0], \ldots, [v_{m-1}]$ being a share obtained by secret sharing a cross tabulation $kv:=v_0, \ldots, v_{m-1}$ in which the number of records of each group when a table including a key attribute and a value attribute is grouped based on a value of the key attribute is set at elements corresponding to the number of groups from the head, and $\{\{\sigma\}\}$ being a share obtained by secret sharing a permutation $\sigma$ which moves elements so that last elements of each group are sequentially arranged from beginning when the table is grouped based on the value of the key attribute, each of the secure computation apparatuses comprising, a count shifting part configured to generate a share $[v']$ which becomes a shifted cross tabulation $v':=v'_0, \ldots, v'_{m-1}$, when reconstructed, by setting $[v'_i]:=[v_{i+1}]$ for each integer i equal to or greater than 0 and equal to or less than m−2 and setting $[v'_{m-1}]:=[0]$ using the share $[v]$, an inverse permutating part configured to generate a share $[u']:=[\sigma^{-1}(v')]$ which becomes an inversely permutated cross tabulation $u':=\sigma^{-1}(v')$ obtained by inversely applying the permutation $\sigma$ to the shifted cross tabulation $v'$, when reconstructed, using the share $[v']$ and the share $\{\{\sigma\}\}$, a partial summing part configured to generate a share $[s']$ which becomes a vector $s':=s'_0, \ldots, s'_{m-1} \in F$, when reconstructed, by setting a sum from $[u'_1]$ to $[u'_{m-1}]$ at $[s'_i]$ for each integer i equal to or greater than 0 and equal to or less than m−1 using the share $[u']$, and an order computing part configured to generate a share $[x']$ which becomes a vector $x':=x'_0, \ldots, x'_{m-1}$ representing descending order within a group, when reconstructed, by setting $[x'_i]:=[m-i-s'_{i-1}]$ for each integer i equal to or greater than 1 and equal to or less than m−1 using the share $[s']$.

Effects of the Invention

According to a secure aggregate order technique according to the present invention, it is possible to efficiently obtain order within a group with the number of times of communication of O(1) while keeping confidentiality.

DETAILED DESCRIPTION OF THE EMBODIMENTS

Embodiments of the present invention will be described in detail below. Note that the same reference numerals will be assigned to components having the same functions in the drawings, and overlapped description will be omitted.

$[x] \in [F]$ indicates that a certain value x is concealed through secret sharing, or the like, on an arbitrary ring F. $\{b\} \in \{B\}$ indicates that a certain value b of one bit is concealed through secret sharing, or the like, on a ring B which can represent one bit. $\{\{s\}\} \in \{\{S\}\}$ indicates that a certain permutation s which belongs to a set $S_m$ of permutations of m elements is concealed through secret sharing, or the like. Hereinafter, a secret shared value will be referred to as a "share".

First Embodiment

<<Ascending Order within Group>>

Figure 1:
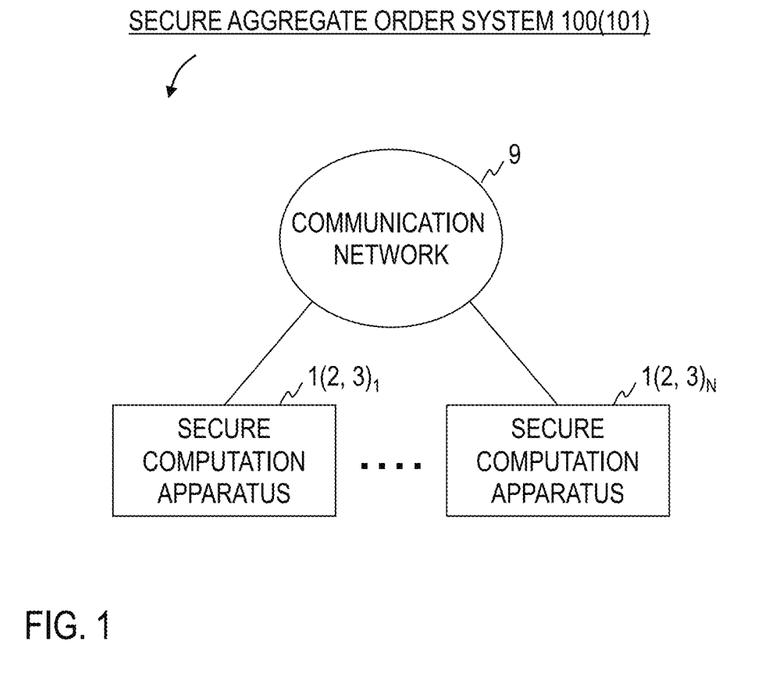
FIG. 1 is a diagram illustrating a functional configuration of a secure aggregate order system.

A first embodiment of the present invention is a secure aggregate order system and method for obtaining ascending order within a group. A configuration example of a secure aggregate order system 100 of the first embodiment will be described with reference to FIG. 1. The secure aggregate order system 100 includes N (≥2) secure computation apparatuses $1_1, \ldots, 1_N$. In the present embodiment, the secure computation apparatuses $1_1, \ldots, 1_N$ are respectively connected to a communication network 9. The communication network 9 is a communication network of a circuit switching system or a packet switching system, configured so that respective connected apparatuses can communicate with each other, and, for example, the Internet, a local area network (LAN), a wide area network (WAN), or the like, can be used. Note that the respective apparatuses do not necessarily have to be able to communicate online via the communication network 9. For example, it is also possible to employ a configuration where information which is to be input to the secure computation apparatuses $1_1, \ldots, 1_N$ is stored in a portable recording medium such as a magnetic tape and a USB memory, and the information is input from the portable recording medium to the secure computation apparatuses $1_1, \ldots, 1_N$ offline.

Figure 2:
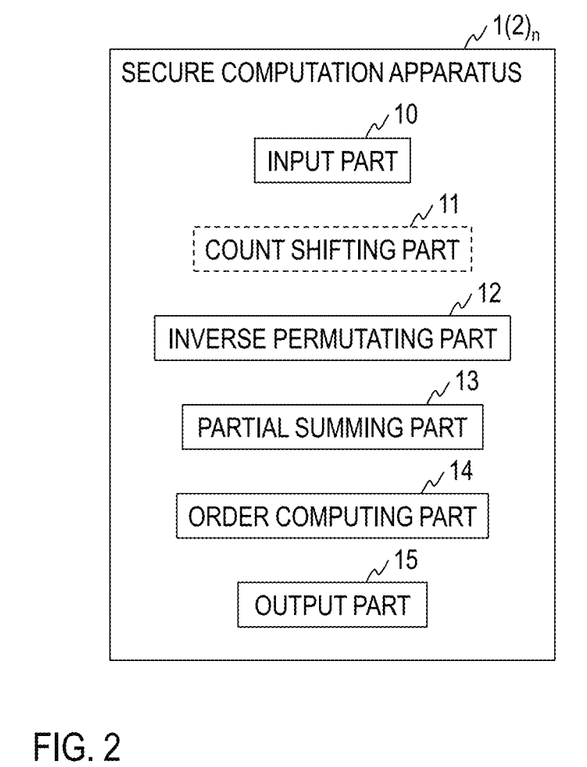
FIG. 2 is a diagram illustrating a functional configuration of a secure computation apparatus.

A configuration example of the secure computation apparatus $1_n$ (n=1, ..., N) included in the secure aggregate order system 100 of the present embodiment will be described with reference to FIG. 2. For example, as illustrated in FIG. 2, the secure computation apparatus $1_n$ includes an input part 10, an inverse permutating part 12, a partial summing part 13, an order computing part 14 and an output part 15. By this secure computation apparatus 1 (1≤n≤N) performing processing in each step which will be described later while cooperating with other secure computation apparatuses $1_{n'}$ (n'=1, ..., N, where n≠n'), the secure aggregate order method of the first embodiment is realized.

The secure computation apparatus $1_n$ is a special apparatus configured by a special program being loaded to a publicly-known or dedicated computer having, for example, a central processing unit (CPU), a main memory (RAM: random access memory), or the like. The secure computation apparatus $1_n$, for example, executes respective kinds of processing under control by the central processing unit. Data input to the secure computation apparatus $1_n$ and data obtained through the respective kinds of processing are stored in, for example, the main memory, and the data stored in the main memory is read out to the central processing unit as necessary and is utilized for other processing. At least part of respective processing parts of the secure computation apparatus $1_n$ may be configured with hardware such as an integrated circuit.

Figure 3:
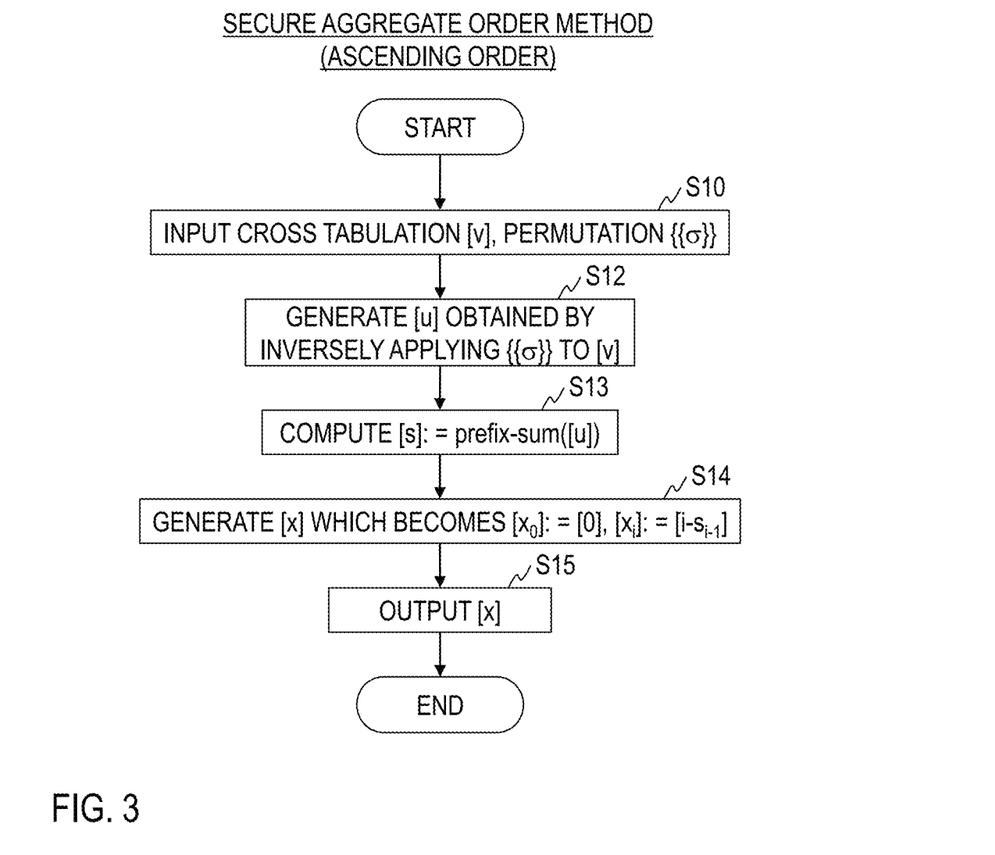
FIG. 3 is a diagram illustrating a processing procedure of a secure aggregate order method (ascending order)

A processing procedure of the secure aggregate order method (ascending order) to be executed by the secure aggregate order system 100 of the first embodiment will be described with reference to FIG. 3.

In step S10, the input part 10 of each secure computation apparatus $1_n$ receives a share $[v] \in [F]^m$ obtained by concealing a cross tabulation $v \in F^m$ through secret sharing, and a share $\{\{\sigma\}\} \in \{\{S_m\}\}$ obtained by concealing a permutation $\sigma$ through secret sharing, as an input. m is an integer equal to or greater than 2. The input part 10 outputs the share $[v]$ of the cross tabulation v and the share $\{\{\sigma\}\}$ of the permutation $\sigma$ to the inverse permutating part 12.

The cross tabulation v is a result obtained by counting the number of records of each group. For example, the cross tabulation v is a vector in which, when a table is stably sorted with a key attribute, records having the same value of the key attribute are put into the same group, a result obtained by counting the number of records of each group is set at elements corresponding to the number of groups from the head, and 0 is set at subsequent elements. The number of groups is an integer equal to or greater than 1 and equal to or less than m, and is not necessarily equal to m. The number of groups is a secret value, and a configuration is employed so that a value of the number of groups is not referred to in the subsequent processing, and processing can be performed even if the number of groups is unknown. Note that stable sort is an operation of storing order of elements of the same value in a case where elements of the same value exist, among sort operations. For example, if a table sorted in order of employee number is stably sorted with gender, a sort result in which order of the employee number is kept in each type of gender can be obtained.

The permutation σ is a permutation which arranges values of key attributes of each group from the head one by one. For example, the permutation σ is a permutation which moves elements so that, when the table is stably sorted with a key attribute, and when records having the same value of the key attribute are put into the same group, the last elements of each groups are sequentially arranged from beginning, and subsequently, other elements are sequentially arranged.

In step S12, the inverse permutating part 12 of each secure computation apparatus $1_n$ generates a share $[u]:=[\sigma^{-1}(v)] \in [F]^m$ which becomes an inversely permutated cross tabulation $u:=\sigma^{-1}(v)$ obtained by inversely applying the permutation σ to the cross tabulation v, when reconstructed, using the share $[v]$ of the cross tabulation v and the share $\{\{\sigma\}\}$ of the permutation σ. Because the cross tabulation v is a vector in which the number of records of each group is set at elements corresponding to the number of groups from the head, and the permutation σ is a permutation which arranges last elements of each group sequentially from beginning, the inversely permutated cross tabulation u obtained by inversely applying the permutation σ to the cross tabulation v becomes a vector in which the number of records of the group is set at the last element of each group. Hereinafter, there is a case where each element of $[u] \in [F]^m$ is referred to by $[u_i] \in [F]$ (i=0, ..., m−1). The inverse permutating part 12 outputs the share $[u]$ of the inversely permutated cross tabulation u to the partial summing part 13.

In step S13, the partial summing part 13 of each secure computation apparatus $1_n$ generates a share $[s] \in [F]^m$ which becomes a vector $s:=s_0, \ldots, s_{m-1} \in F$, when reconstructed, by computing $[s]:=$prefix-sum$([u])$ using the share $[u]$ of the inversely permutated cross tabulation u. Here, prefix-sum is an operation for setting a sum from the 0-th element $u_0$ to the i-th element $u_i$ of an input vector u at the i-th element $s_i$ of an output vector s for each integer i equal to or greater than 0 and equal to or less than m−1, using m as a length of the input vector u. The partial summing part 13 outputs the share $[s]$ of the vector s to the order computing part 14.

In step S14, the order computing part 14 of each secure computation apparatus $1_n$ generates a share $[x] \in [F]^m$ which becomes ascending order $x:=x_0, \ldots, x_{m-1} \in F$ within the group, when reconstructed, by setting $[x_i]:=[i-s_{i-1}]$ for each integer i equal to or greater than 1 and equal to or less than m−1 and setting $[x_0]:=[0]$ using the share $[s]$ of the vectors. It should be noted that the ascending order within the group starts from 0. If it is desired to obtain order starting from 1, it is only necessary to add 1 to each order. In other words, to generate the ascending order x, it is only necessary to set $[x_i]:=[i-s_{i-1}+1]$ for each integer i equal to or greater than 1 and equal to or less than m−1 and set $[x_0]:=[1]$. The order computing part 14 outputs the share $[x]$ of the ascending order x to the output part 15.

In step S15, the output part 15 of each secure computation apparatus $1_n$ outputs the share $[x]$ of the ascending order x.

Second Embodiment

<<Descending Order within Group>>

A second embodiment of the present invention is a secure aggregate order system and method for obtaining descending order within a group. A configuration example of a secure aggregate order system 101 of the second embodiment will be described with reference to FIG. 1. The secure aggregate order system 101 of the present embodiment includes N (≥2) secure computation apparatuses $2_1, \ldots, 2_N$. In the present embodiment, the secure computation apparatuses $2_1, \ldots, 2_N$ are respectively connected to the communication network 9. The communication network 9 is a communication network of a circuit switching system or a packet switching system, configured so that respective connected apparatuses can communicate with each other, and, for example, the Internet, a local area network (LAN), a wide area network (WAN), or the like, can be used. Note that the respective apparatuses do not necessarily have to be able to communicate online via the communication network 9. For example, it is also possible to employ a configuration where information which is to be input to the secure computation apparatuses $2_1, \ldots, 2_N$ is stored in a portable recording medium such as a magnetic tape and a USB memory, and the information is input from the portable recording medium to the secure computation apparatuses $2_1, \ldots, 2_N$ offline.

A configuration example of the secure computation apparatus $2_n$ (n=1, ..., N) included in the secure aggregate order system 101 of the present embodiment will be described with reference to FIG. 2. For example, as illustrated in FIG. 2, the secure computation apparatus $2_n$ further includes a count shifting part 11 in addition to processing parts provided at the secure computation apparatus $1_n$ included in the secure aggregate order system 100 of the first embodiment. By this secure computation apparatus $2_n$ (1≤n≤N) performing processing in each step which will be described later while cooperating with another secure computation apparatus $2_{n'}$ (n'=1, ..., N, where n≠n'), the secure aggregate order method of the second embodiment is realized.

Figure 4:
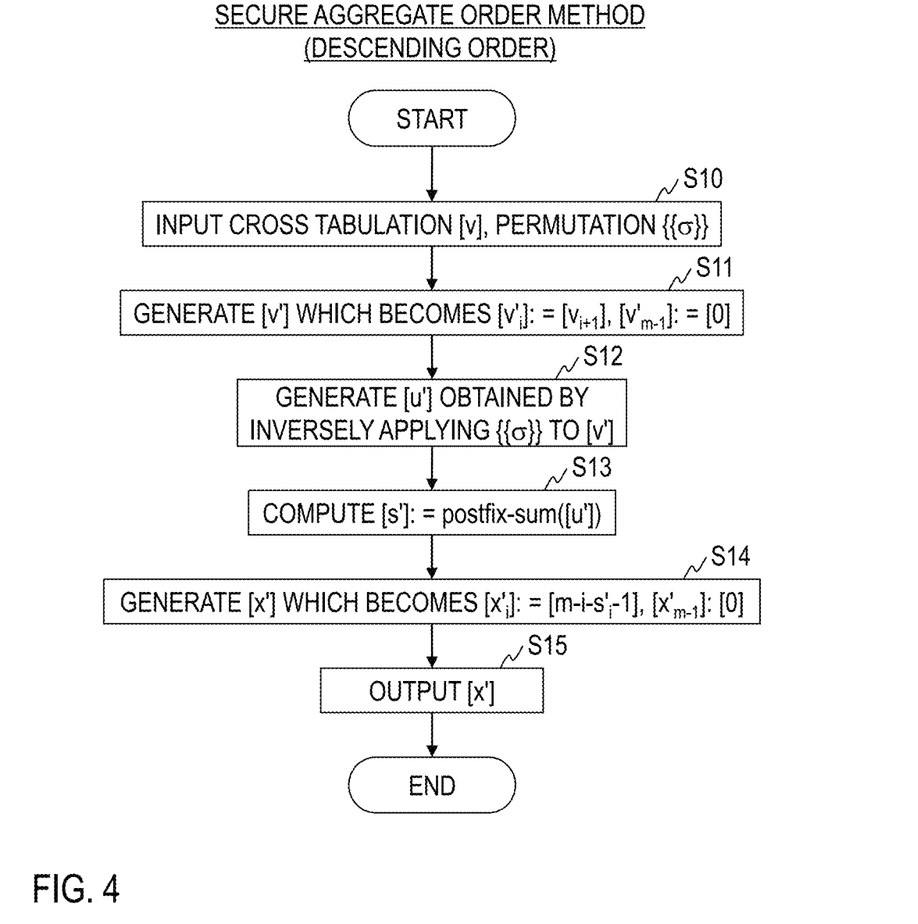
FIG. 4 is a diagram illustrating a processing procedure of a secure aggregate order method (descending order)

A processing procedure of the secure aggregate order method (descending order) to be executed by the secure aggregate order system 101 of the second embodiment will be described with reference to FIG. 4.

In step S10, the input part 10 of each secure computation apparatus $2n$ receives a share $[v] \in [F]^m$ obtained by concealing the cross tabulation $v \in F^m$ through secret sharing, and a share $\{\{\sigma\}\} \in \{\{S_m\}\}$ obtained by concealing the permutation σ through secret sharing, as an input. The input part 10 outputs the share $[v]$ of the cross tabulation v to the count shifting part 11. Further, the input part 10 outputs the share $\{\{\sigma\}\}$ of the permutation σ to the inverse permutating part 12.

In step S11, the count shifting part 11 of each secure computation apparatus $2_n$ generates a share $[v'] \in [F]^m$ which becomes a shifted cross tabulation $v':=v'_0, \ldots, v'_{m-1} \in F^m$, when reconstructed, by setting $[v'_i]:=[v_{i+1}]$ for each integer i equal to or greater than 0 and equal to or less than m−2 and setting $[v'_{m-1}]:=[0]$ using the share $[v]$ of the cross tabulation v. The shifted cross tabulation v' becomes a vector in which the cross tabulation v which is a vector representing the number of records of each group is shifted forward one by one. The count shifting part 11 outputs the share $[v']$ of the shifted cross tabulation v' to the inverse permutating part 12.

In step S12, the inverse permutating part 12 of each secure computation apparatus $2_n$ generates a share $[u']:=[\sigma^{-1}(v')] \in [F]^m$ which becomes an inversely permutated cross tabulation $u':=\sigma^{-1}(v')$ obtained by inversely applying the permutation σ to the shifted cross tabulation v', when reconstructed, using the share $[v']$ of the shifted cross tabulation v' and the share $\{\{\sigma\}\}$ of the permutation σ. Because the shifted cross tabulation v' is a vector obtained by shifting forward one by one, the cross tabulation v in which the number of records of each group is set at elements corresponding to the number of groups from the head, and the permutation σ is a permutation which arranges last elements of each group sequentially from beginning, the inversely permutated cross tabulation u' obtained by inversely applying the permutation σ to the shifted cross tabulation v' becomes a vector in which the number of records of a group one group backward is set at the last element of each group. Hereinafter, there is a case where each element of $[u']\in[F]^m$ is referred to by $[u'_i]\in[F]$ (i=0, ..., m−1). The inverse permutating part 12 outputs the share [u'] of the inversely permutated cross tabulation u' to the partial summing part 13.

In step S13, the partial summing part 13 of each secure computation apparatus $2_n$ generates a share $[s']\in[F]^m$ which becomes a vector $s':=s'_0, \ldots, s'_{m-1}\in F$, when reconstructed, by computing [s']:=postfix-sum([u']) using the share [u'] of the inversely permutated cross tabulation u'. Here, postfix-sum is an operation for setting a sum from the i-th element u' to the m−1-th element $u'_{m-1}$ of an input vector u' at the i-th element $s'_i$ of an output vector s' for each integer i equal to or greater than 0 and equal to or less than m−1, using m as a length of the input vector u'. The partial summing part 13 outputs the share [s'] of the vector s' to the order computing part 14.

In step S14, the order computing part 14 of each secure computation apparatus $2_n$ generates a share $[x']\in[F]^m$ which becomes descending order $x':=x'_0, \ldots, x'_{m-1}\in F$ within the group, when reconstructed, by setting $[x'_i]:=[m-i-s'_i-1]$ for each integer i equal to or greater than 0 and equal to or less than m−1 using the share [s'] of the vector s'. It should be noted that the descending order within the group starts from 0. If it is desired to obtain order starting from 1, it is only necessary to add 1 to each order. In other words, to generate the descending order x', it is only necessary to set $[x'_i]:=[m-i-s'_i]$ for each integer i equal to or greater than 0 and equal to or less than m−1. The order computing part 14 outputs the share [x'] of the descending order x' to the output part 15.

In step S15, the output part 15 of each secure computation apparatus $2_n$ outputs the share [x'] of the descending order x'.

<Modification>

In the above-described embodiments, a configuration has been described where the share [v] of the cross tabulation v and the share {{σ}} of the permutation σ are input to the input part 10. In the modification, a configuration will be described where a share obtained by concealing a table through secret sharing, or the like, is input to the input part 10, and, after the share [v] of the cross tabulation v and the share {{σ}} of the permutation σ are obtained, order within the group is computed in accordance with the procedure described in the above-described embodiments.

Figure 5:
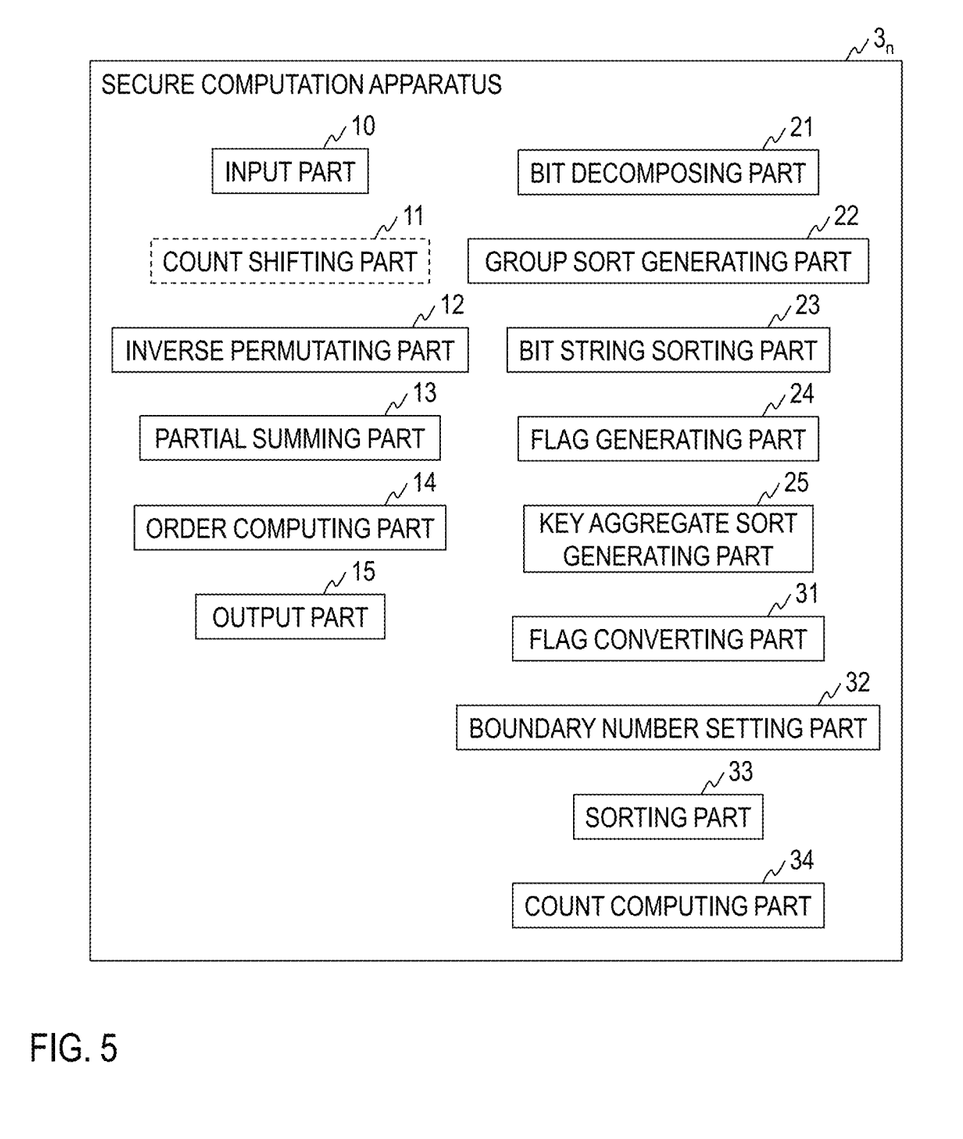
FIG. 5 is a diagram illustrating a functional configuration of a secure computation apparatus of a modification.

For example, as illustrated in FIG. 5, the secure computation apparatus $3_n$ (n=1, ..., N) of the modification includes a bit decomposing part 21, a group sort generating part 22, a bit string sorting part 23, a flag generating part 24, a key aggregate sort generating part 25, a flag converting part 31, a boundary number setting part 32, a sorting part 33 and a count computing part 34 in addition to the respective processing parts provided at the secure computation apparatus $1_n$ (n=1, ..., N) of the first embodiment or the secure computation apparatus $2_n$ (n=1, ..., N) of the second embodiment. Only a difference from the secure aggregate order system of the first embodiment and the second embodiment will be described below.

The input part 10 of each secure computation apparatus $3_n$ receives a share $[k_0], \ldots, [k_{nk-1}]\in[F]^m$ obtained by concealing each of $n_k$ key attributes $k_0, \ldots, k_{nk-1}\in F^m$ through secret sharing, and a share $[v_0], \ldots, [v_{na-1}]\in[F]^m$ obtained by concealing each of $n_a$ value attributes $v_0, \ldots, v_{na-1}\in F^m$ through secret sharing, as input. However, $n_k$ and $n_a$ are integers equal to or greater than 1. Hereinafter, there is a case where each element of $[k_j]\in[F]^m$ (j=0, ..., $n_k-1$) is referred to by $[k_{j,i}]\in[F]$ (i=0, ..., m−1). The input part 10 outputs shares $[k_0], \ldots, [k_{nk-1}]$ of the key attributes $k_0, \ldots, k_{nk-1}$ to the bit decomposing part 21.

The bit decomposing part 21 of each secure computation apparatus $3_n$ bit-decomposes and concatenates the shares $[k_0], \ldots, [k_{nk-1}]$ of the key attributes $k_0, \ldots, k_{nk-1}$ and obtains a share $\{b\}\in\{B\}^\lambda$ which becomes a bit string $b:=b_0, \ldots, b_{m-1}\in B^\lambda$ which is a concatenated bit expression of the key attributes $k_0, \ldots, k_{nk-1}$, when reconstructed. Note that λ is a bit length of the bit string b, and a sum of bit lengths of respective $b_i$ (i=0, ..., m−1). In other words, $\{b_i\}$ is a bit string obtained by concatenating bit expression of the i-th elements $[k_{0,i}], \ldots, [k_{nk-,i}]$ of the respective shares $[k_0], \ldots, [k_{nk-1}]$ of the key attributes $k_0, \ldots, k_{nk-1}$. The bit decomposing part 21 outputs the share {b} of the bit string b to the group sort generating part 22.

The group sort generating part 22 of each secure computation apparatus $3_n$ generates a share $\{\{\sigma_0\}\}\in\{\{S_m\}\}$ which becomes a permutation $\sigma_0$ which stably sorts the bit string b in ascending order, when reconstructed, using the share {b} of the bit string b. Because the bit string b is a concatenated bit expression of the key attributes $k_0, \ldots, k_{nk-1}$, it can be said that the permutation $\sigma_0$ is an operation of grouping records by rearranging the records so that records having same values of the key attributes $k_0, \ldots, k_{nk-1}$ are successive. The group sort generating part 22 outputs the share {b} of the bit string b and the share $\{\{\sigma_0\}\}$ of the permutation $\sigma_0$ to the bit string sorting part 23.

The bit string sorting part 23 of each secure computation apparatus $3_n$ obtains a share $\{b'\}\in\{B\}$ which becomes a sorted bit string $b':=b'_0, \ldots, b'_{m-1}\in B^\lambda$ obtained by sorting the bit string b with the permutation $\sigma_0$, when reconstructed, using the share {b} of the bit string b and the share $\{\{\sigma_0\}\}$ of the permutation $\sigma_0$. The bit string sorting part 23 outputs the share {b'} of the sorted bit string b' to the flag generating part 24.

The flag generating part 24 of each secure computation apparatus $3_n$ generates a share $\{e\}\in\{B\}^m$ which becomes a flag $e:=e_0, \ldots, e_{m-1}\in B^m$, when reconstructed, by setting $\{e_i\}:=\{b'_i+*b'_{i+1}\}$ for each integer i equal to or greater than 0 and equal to or less than m−2 and setting $\{e_{m-1}\}:=\{1\}$, using the share {b'} of the sorted bit string b'. Because true is set at the flag $e_i$ if the i-th element $b'_i$ of the sorted bit string b' is different from the i+1-th element $b'_{i+1}$, the flag $e_i$ becomes a flag which indicates the last element of each group (that is, an element immediately before the boundary between groups). The flag generating part 24 outputs the share {e} of the flag e to the key aggregate sort generating part 25. Further, the flag generating part 24 outputs the share {e} of the flag e to the flag converting part 31.

The key aggregate sort generating part 25 of each secure computation apparatus $3_n$ first generates a share $\{e'\}\in\{B\}^m$ which becomes a flag e' which is a negation ¬e of the flag e, when reconstructed, using the share {e} of the flag e. In other words, the key aggregate sort generating part 25 sets $\{e'_i\}:=\{\neg e_i\}$ for each integer i equal to or greater than 0 and equal to or less than m−1. Then, the key aggregate sort generating part 25 generates a share $\{\{\sigma\}\}\in\{\{S_m\}\}$ which becomes a permutation σ which stably sorts the flag e' in ascending order, when reconstructed, using the share {e'} of the flag e'. The key aggregate sort generating part 25 outputs the share $\{\{\sigma\}\}$ of the permutation σ to the sorting part 33. Further, the key aggregate sort generating part 25 outputs the share $\{\{\sigma\}\}$ of the permutation σ to the count shifting part 11 or the inverse permutating part 12.

The flag converting part 31 of each secure computation apparatus $3_n$ converts the share $\{e\} \in \{B\}^m$ of the flag e into a share $[e] \in [F]^m$ on an arbitrary ring F through secret sharing. The flag converting part 31 outputs the share [e] of the flag e to the boundary number setting part 32.

The boundary number setting part 32 of each secure computation apparatus $3_n$ generates a share $[x''] \in [F]^m$ which becomes a vector $x'':=x''_0, \ldots, x''_{m-1} \in F$, when reconstructed, by setting $[x''_i]:=[e_i?i+1:m]$ for each integer i equal to or greater than 0 and equal to or less than m−1 using the share [e] of the flag e. Here, "?" is a conditional operator (ternary operator). In other words, when $[e_i]$ is true (for example, $[e_i]=[1]$), $[x''_i]:=[i+1]$ is set, and when $[e_i]$ is false (for example, $[e_i]=[0]$), $[x''_i]:=[m]$ is set. The vector x'' becomes a vector in which, when the table is stably sorted with the key attribute, records having the same value of the key attribute are put into the same group, at the last element of each group, a position from the head of the next element is set, and, at the other elements, the number of records of the whole table is set. In other words, at the last element of each group, a total value obtained by accumulating the number of records of respective groups from the head group to the group is set. The boundary number setting part 32 outputs the share [x''] of the vector x'' to the sorting part 33.

The sorting part 33 of each secure computation apparatus $3n$ generates a share $[\sigma(x'')] \in [F]^m$ which becomes a sorted vector σ(x'') obtained by sorting the vector x'' with the permutation σ, when reconstructed, using the share [x''] of the vector x'' and the share $\{\{\sigma\}\}$ of the permutation σ. Hereinafter, there is a case where each element of $[\sigma(x'')] \in [F]^m$ is referred to by $[\sigma(x'')_i] \in [F]$ (i=0, ..., m−1). The sorting part 33 outputs the share $[\sigma(x'')]$ of the sorted vector σ(x'') to the count computing part 34.

The count computing part 34 of each secure computation apparatus $3_n$ generates a share $[v] \in [F]^m$ which becomes a vector $v:=v_0, \ldots, v_{m-1} \in F$ representing the number of records of each group (that is, a cross tabulation), when reconstructed, by setting $[v_i]:=[\sigma(x'')_i - \sigma(x'')_{i-1}]$ for each integer i equal to or greater than 1 and equal to or less than min(g, m)−1, setting $[v_i]:=[0]$ for each integer i equal to or greater than min(g, m) and equal to or less than m−1, and setting $[v_0]:=[\sigma(x'')_0]$ using the share $[\sigma(x'')]$ of the sorted vector σ(x''). Because a total value obtained by accumulating the number of records of respective groups from the 0-th group to the i-th group is set at the i-th element σ(x''); of the sorted vector σ(x''), the number of records of the i-th group is set at the i-th element $v_i$ of the cross tabulation v. The count computing part 34 outputs the share [v] of the cross tabulation v to the count shifting part 11 or the inverse permutating part 12.

While the embodiments of the present invention have been described above, it goes without saying that a specific configuration is not limited to these embodiments, and design change, or the like, within the scope not deviating from the gist of the present invention are incorporated into the present invention. Various kinds of processing described in the embodiments are executed not only in chronological order in accordance with order of description, but also executed in parallel or individually in accordance with processing performance of apparatuses which execute the processing or as necessary.

[Program, Recording Medium]

In a case where various kinds of processing functions of the respective apparatuses described in the above-described embodiments are realized with a computer, a processing content of the functions which should be provided at the respective apparatuses is described with a program. Then, by this program being executed with the computer, various kinds of processing functions at the above-described respective apparatuses are realized on the computer.

The program describing this processing content can be recorded in a computer-readable recording medium. As the computer-readable recording medium, any medium such as, for example, a magnetic recording device, an optical disk, a magnetooptical recording medium and a semiconductor memory can be used.

Further, this program is distributed by, for example, a portable recording medium such as a DVD and a CD-ROM in which the program is recorded being sold, given, lent, or the like. Still further, it is also possible to employ a configuration where this program is distributed by the program being stored in a storage device of a server computer and transferred from the server computer to other computers via a network.

A computer which executes such a program, for example, first, stores a program recorded in the portable recording medium or a program transferred from the server computer in the storage device of the own computer once. Then, upon execution of the processing, this computer reads out the program stored in the storage device of the own computer and executes the processing in accordance with the read program. Further, as another execution form of this program, the computer may directly read a program from the portable recording medium and execute the processing in accordance with the program, and, further, sequentially execute the processing in accordance with the received program every time the program is transferred from the server computer to this computer. Further, it is also possible to employ a configuration where the above-described processing is executed by so-called ASP (Application Service Provider) type service which realizes processing functions only by an instruction of execution and acquisition of a result without the program being transferred from the server computer to this computer. Note that, it is assumed that the program in the present embodiment includes information which is to be used for processing by an electronic computer, and which is equivalent to a program (not a direct command to the computer, but data, or the like, having property specifying processing of the computer).

Further, while, in this embodiment, the present apparatus is constituted by a predetermined program being executed on the computer, at least part of the processing content may be realized with hardware.

What is claimed is:

1. A secure aggregate order system comprising a plurality of secure computation apparatuses, m being an integer equal to or greater than 2, [v]: = $[v_0], \ldots, [v_{m-1}]$ being a share obtained by secret sharing a cross tabulation v: $=v_0, \ldots, v_{m-1}$ in which the number of records of each group when a table including a key attribute and a value attribute is grouped based on a value of the key attribute is set at elements corresponding to the number of groups from the head, and $\{\{\sigma\}\}$ being a share obtained by secret sharing a permutation σ which moves elements so that last elements of each group are sequentially arranged from beginning when the table is grouped based on the value of the key attribute, each of the secure computation apparatuses comprising processing circuitry configured to:

generate a share [u]: $=[\sigma^{-1}(v)]$ which becomes an inversely permutated cross tabulation u: $=\sigma^{-1}(v)$ obtained by inversely applying the permutation $\sigma$ to the cross tabulation v, when reconstructed, using the share [v] and the share $\{\{\sigma\}\}$;

generate a share [s] which becomes a vector s: $=s_0, \ldots, s_{m-1} \in F$, when reconstructed, by setting a sum from $[u_0]$ to $[u_i]$ at $[s_i]$ for each integer i equal to or greater than 0 and equal to or less than m−1 using the share [u]; and generate a share [x] which becomes a vector x: $= x_0, \ldots, x_{m-1}$ representing ascending order within a group, when reconstructed, by setting $[x_i] := [i - s_{i-1}]$ for each integer i equal to or greater than 1 and equal to or less than m−1 and setting $[x_0] := [0]$ using the share [s].

2. The secure aggregate order system according to claim 1, wherein F is an arbitrary ring, $n_k$ is an integer equal to or greater than 1, and $[k_0], \ldots, [k_{nk-1}]$ are shares obtained by secret sharing key attributes $k_0, \ldots, k_{nk-1} \in F^m$, the processing circuitry is further configured to:

generate a share $\{\{\sigma_0\}\}$ which becomes a permutation $\sigma_0$ which stably sorts a bit string b in ascending order, when reconstructed, from a share $\{b\}$ which becomes the bit string b: $=b_0, \ldots, b_{m-1}$ obtained by bit-decomposing and concatenating the key attributes $k_0, \ldots, k_{nk-1}$, when reconstructed, using the shares $[k_0], \ldots, [k_{nk-1}]$;

generate a share $\{b'\}$ which becomes a sorted bit string b': $=b'_0, \ldots, b'_{m-1}$ obtained by sorting the bit string b with the permutation $\sigma_0$, when reconstructed, using the share $\{b\}$ and the share $\{\{\sigma_0\}\}$;

generate the share $\{e\}$ which becomes the flag e: $= e_0, \ldots, e_{m-1}$, when reconstructed, by setting $\{e_i\} := \{b' \neq b'_{i+1}\}$ for each integer i equal to or greater than 0 and equal to or less than m−2 and setting $\{e_{m-1}\} := \{1\}$ using the share $\{b'\}$;

generate the share $\{\{\sigma\}\}$ which becomes the permutation a which stably sorts a negation of the flag ¬e in ascending order, when reconstructed, using the share $\{e\}$;

generate a share [x″] which becomes a vector x″: $= x″_0, \ldots, x″_{m-1}$, when reconstructed, by setting $[x″_i] := [i+1]$ when $\{e_i\}$ is true, and setting $[x″_i] := [m]$ if $\{e_i\}$ is false for each integer i equal to or greater than 0 and equal to or less than m−1 using the share $\{e\}$;

generate a share $[\sigma(x″)]$ which becomes a sorted vector $\sigma(x″)$ obtained by sorting the vector x″ with the permutation a, when reconstructed, using the share [x″] and the share $\{\{\sigma\}\}$; and generate a share [v] which becomes a vector v: $= v_0, \ldots, v_{m-1}$ representing the number of records of each group, when reconstructed, by setting $[v_i] := [\sigma(x″)_i - \sigma(x″)_{i-1}]$ for each integer i equal to or greater than 1 and equal to or less than min(g, m)−1, set $[v_i] := [0]$ for each integer i equal to or greater than min(g, m) and equal to or less than m−1, and setting $[v_0] := [\sigma(x″)_0]$ using the share $[\sigma(x″)]$.

3. A secure aggregate order system comprising a plurality of secure computation apparatuses, m being an integer equal to or greater than 2, [v]: $= [v_0], \ldots, [v_{m-1}]$ being a share obtained by secret sharing a cross tabulation v: $=v_0, \ldots, v_{m-1}$ in which the number of records of each group when a table including a key attribute and a value attribute is grouped based on a value of the key attribute is set at elements corresponding to the number of groups from the head, and $\{\{\sigma\}\}$ being a share obtained by secret sharing a permutation a which moves elements so that last elements of each group are sequentially arranged from beginning when the table is grouped based on the value of the key attribute, each of the secure computation apparatuses comprising processing circuitry configured to:

generate a share [v′] which becomes a shifted cross tabulation v′: $=v'_0, \ldots, v'_{m-1}$, when reconstructed, by setting $[v'_i] := [v_{i+1}]$ for each integer i equal to or greater than 0 and equal to or less than m−2 and setting $[v'_{m-1}] := [\sigma']$ using the share [v];

generate a share [u′]: $=[\sigma^{-1}(v)]$ which becomes an inversely permutated cross tabulation u′: $=\sigma^{-1}(V)$ obtained by inversely applying the permutation a to the shifted cross tabulation v′, when reconstructed, using the share [v′] and the share $\{\{\sigma\}\}$;

generate a share [s′] which becomes a vector s′: $= s'_0, \ldots, s'_{m-1} \in F$, when reconstructed, by setting a sum from [di] to $[u'_{m-i}]$ at [s′i] for each integer i equal to or greater than 0 and equal to or less than m−1 using the share [u′]; and generate a share [x′] which becomes a vector x′: $= x'_0, \ldots, x'_{m-1}$ representing descending order within a group, when reconstructed, by setting $[x'i] := [m - i - s'_i - 1]$ for each integer i equal to or greater than 1 and equal to or less than m−1 using the share [s′].

4. The secure aggregate order system according to claim 3, wherein F is an arbitrary ring, $n_k$ is an integer equal to or greater than 1, and $[k_0], [k_{nk-1}]$ are shares obtained by secret sharing key attributes $k_0, k_{nk-1} \in F^m$, the processing circuitry is further configured to:

generate a share $\{\{\sigma_0\}\}$ which becomes a permutation $\sigma_0$ which stably sorts a bit string b in ascending order, when reconstructed, from a share $\{b\}$ which becomes the bit string b: $=b_0, b_{m-1}$ obtained by bit-decomposing and concatenating the key attributes $k_0, k_{nk-1}$, when reconstructed, using the shares $[k_0], [k_{nk-1}]$;

generate a share $\{b'\}$ which becomes a sorted bit string b′: $=b'_0, b'_{m-1}$ obtained by sorting the bit string b with the permutation $\sigma_0$, when reconstructed, using the share $\{b\}$ and the share $\{\{\sigma_0\}\}$;

generate the share $\{e\}$ which becomes the flag e: $=e_0, e_{m-1}$, when reconstructed, by setting $\{e_i\} := \{b'_i \neq b'_{i+1}\}$ for each integer i equal to or greater than 0 and equal to or less than m−2 and setting $\{e_{m-1}\} := \{1\}$ using the share $\{b'\}$;

generate the share $\{\{\sigma\}\}$ which becomes the permutation $\sigma$ which stably sorts a negation of the flag ¬e in ascending order, when reconstructed, using the share $\{e\}$;

generate a share [x″] which becomes a vector x″: $= x″_0, \ldots, x″_{m-1}$, when reconstructed, by setting $[x″_i] := [i+1]$ when $\{e_i\}$ is true, and setting $[x″_i] := [m]$ if $\{e_i\}$ is false for each integer i equal to or greater than 0 and equal to or less than m−1 using the share $\{e\}$;

generate a share $[\sigma(x″)]$ which becomes a sorted vector $\sigma(x″)$ obtained by sorting the vector x″ with the permutation a, when reconstructed, using the share [x″] and the share $\{\{\sigma\}\}$; and generate a share [v] which becomes a vector v: $=v_0, v_{m-1}$ representing the number of records of each group, when reconstructed, by setting $[v_i] := [\sigma(x″)_i - \sigma(x″)_{i-1}]$ for each integer i equal to or greater than 1 and equal to or less than min(g, m)−1, set $[v_i]$ :=[0] for each integer i equal to or greater than min(g, m) and equal to or less than m−1, and setting $[v_0]$ :=$[\sigma(x'')_0]$ using the share $[\sigma(x'')]$.

5. A secure computation apparatus, m being an integer equal to or greater than 2, [v]: = $[v_0], \ldots, [v_{m-1}]$ being a share obtained by secret sharing a cross tabulation v: =$v_0, \ldots, v_{m-1}$ in which the number of records of each group when a table including a key attribute and a value attribute is grouped based on a value of the key attribute is set at elements corresponding to the number of groups from the head, and $\{\{\sigma\}\}$ being a share obtained by secret sharing a permutation a which moves elements so that last elements of each group are sequentially arranged from beginning when the table is grouped based on the value of the key attribute, the secure computation apparatus comprising processing circuitry configured to:

generate a share [u]: =$[\sigma^{-1}(v)]$ which becomes an inversely permutated cross tabulation u: =$\sigma^{-1}(v)$ obtained by inversely applying the permutation $\sigma$ to the cross tabulation v, when reconstructed, using the share [v] and the share $\{\{\sigma\}\}$;

generate a share [s] which becomes a vector s: =$s_0, \ldots, s_{m-1} \in F$, when reconstructed, by setting a sum from $[u_0]$ to $[u_i]$ at $[s_i]$ for each integer i equal to or greater than 0 and equal to or less than m−1 using the share [u]; and generate a share [x] which becomes a vector x: = $x_0, \ldots, x_{m-1}$ representing ascending order within a group, when reconstructed, by setting $[x_i]$ :=$[i-s_{i-1}]$ for each integer i equal to or greater than 1 and equal to or less than m−1 and setting $[x_0]$ :=[0] using the share [s].

6. A non-transitory computer-readable recording medium on which a program recorded thereon for causing a computer to function as the secure computation apparatus according to claim 5.

7. A secure computation apparatus, m being an integer equal to or greater than 2, [v]: = $[v_0], \ldots, [v_{m-1}]$ being a share obtained by secret sharing a cross tabulation v: =$v_0, \ldots, v_{m-1}$ in which the number of records of each group when a table including a key attribute and a value attribute is grouped based on a value of the key attribute is set at elements corresponding to the number of groups from the head, and $\{\{\sigma\}\}$ being a share obtained by secret sharing a permutation $\sigma$ which moves elements so that last elements of each group are sequentially arranged from beginning when the table is grouped based on the value of the key attribute, the secure computation apparatus comprising processing circuitry configured to:

generate a share [v'] which becomes a shifted cross tabulation v': =$v'_0, \ldots, v'_{m-1}$, when reconstructed, by setting [v'i]: =$[v_{i+1}]$ for each integer i equal to or greater than 0 and equal to or less than m−2 and setting $[v'_{m-1}]$ :=[0] using the share [v];

generate a share [u']: =$[\sigma^{-1}(v')]$ which becomes an inversely permutated cross tabulation u': =$\sigma^{-1}(v')$ obtained by inversely applying the permutation $\sigma$ to the shifted cross tabulation v', when reconstructed, using the share [V'] and the share $\{\{\sigma\}\}$;

generate a share [s'] which becomes a vector s': = $s'_0, \ldots, s'_{m-1} \in F$, when reconstructed, by setting a sum from $[u'_i]$ to $[u'_{m-1}]$ at $[s'_i]$ for each integer i equal to or greater than 0 and equal to or less than m−1 using the share [u']; and generate a share [x'] which becomes a vector x': = $x'_0, \ldots, x'_{m-1}$ representing descending order within a group, when reconstructed, by setting [x'i]: =$[m-i-s'_i-1]$ for each integer i equal to or greater than 1 and equal to or less than m−1 using the share [s'].

8. A non-transitory computer-readable recording medium on which a program recorded thereon for causing a computer to function as the secure computation apparatus according to claim 7.

9. A secure aggregate order method to be executed by a secure aggregate order system comprising a plurality of secure computation apparatuses, m being an integer equal to or greater than 2, [v]: = $[v_0], \ldots, [v_{m-1}]$ being a share obtained by secret sharing a cross tabulation v: =$v_0, \ldots, v_{m-1}$ in which the number of records of each group when a table including a key attribute and a value attribute is grouped based on a value of the key attribute is set at elements corresponding to the number of groups from the head, and $\{\{\sigma\}\}$ being a share obtained by secret sharing $\sigma$ permutation a which moves elements so that last elements of each group are sequentially arranged from beginning when the table is grouped based on the value of the key attribute, the secure aggregate order method comprising:

generating, by processing circuitry of each of the secure computation apparatuses, a share [u]: =$[\sigma^{-1}(v)]$ which becomes an inversely permutated cross tabulation u: =$\sigma^{-1}(v)$ obtained by inversely applying the permutation $\sigma$ to the cross tabulation v, when reconstructed, using the share [v] and the share $\{\{\sigma\}\}$;

generating, by the processing circuitry of each of the secure computation apparatuses, a share [s] which becomes a vector s: =$s_0, \ldots, s_{m-1} \in F$, when reconstructed, by setting a sum from $[u_0]$ to $[u_i]$ at $[s_i]$ for each integer i equal to or greater than 0 and equal to or less than m−1 using the share [u]; and generating, by the processing circuitry of each of the secure computation apparatuses, a share [x] which becomes a vector x: =$x_0, \ldots, x_{m-1}$ representing ascending order within a group, when reconstructed, by setting $[x_i]$: =$[i-s_{i-1}]$ for each integer i equal to or greater than 1 and equal to or less than m−1 and setting $[x_0]$: =[0] using the share [s].

10. A secure aggregate order method to be executed by a secure aggregate order system comprising a plurality of secure computation apparatuses, m being an integer equal to or greater than 2, [v]: = $[v_0], \ldots, [v_{m-1}]$ being a share obtained by secret sharing a cross tabulation v: =$v_0, \ldots, v_{m-1}$ in which the number of records of each group when a table including a key attribute and a value attribute is grouped based on a value of the key attribute is set at elements corresponding to the number of groups from the head, and $\{\{\sigma\}\}$ being a share obtained by secret sharing a permutation a which moves elements so that last elements of each group are sequentially arranged from beginning when the table is grouped based on the value of the key attribute, the secure aggregate order method comprising:

generating, by processing circuitry of each of the secure computation apparatuses, a share [v'] which becomes a shifted cross tabulation v': =$v'_0, \ldots, v'_{m-1}$, when reconstructed, by setting $[v'_i$: =$[v_{i+1}]$ for each integer i equal to or greater than 0 and equal to or less than $m-2$ and setting $[v'_{m-1}] := [0]$ using the share $[v]$;

generating, by the processing circuitry of each of the secure computation apparatuses, a share $[u'] := [\sigma^{-1}(v')]$ which becomes an inversely permutated cross tabulation $u' := \sigma^{-1}(V)$ obtained by inversely applying the permutation a to the shifted cross tabulation $v'$, when reconstructed, using the share $[V']$ and the share $\{\{\sigma\}\}$;

generating, by the processing circuitry of each of the secure computation apparatuses, a share $[s']$ which becomes a vector $s' := s'_0, \ldots, s'_{m-1} \in F$, when reconstructed, by setting a sum from $[u'_i]$ to $[u'_{m-i}]$ at $[s'_i]$ for each integer i equal to or greater than 0 and equal to or less than $m-1$ using the share $[u']$; and generating, by the processing circuitry of each of the secure computation apparatuses, a share $[x']$ which becomes a vector $x' := x'_0, \ldots, x'_{m-1}$ representing descending order within a group, when reconstructed, by setting $[x'i] := [m-i-s'_i-1]$ for each integer i equal to or greater than 1 and equal to or less than $m-1$ using the share $[s']$.

\* \* \* \* \*